United States Patent [19]

Haupt et al.

[11] 3,901,870

[45] Aug. 26, 1975

[54] DERIVATIVE OF ALPHA$_1$-FETOSPECIFIC SERUM PROTEIN AND PROCESS FOR ITS MANUFACTURE

[75] Inventors: Heinz Haupt, Marburg an der Lahn; Siegfried Baudner, Marbach near Marburg and der Lahn, both of Germany

[73] Assignee: Behringwerke Aktiengesellschaft, Marburg an der Lahn, Germany

[22] Filed: Mar. 12, 1974

[21] Appl. No.: 450,403

[52] U.S. Cl.................. 260/112 R; 424/2; 424/88; 195/29; 204/180 G
[51] Int. Cl.............................................. C12d 1/00
[58] Field of Search...................... 195/29; 260/112; 204/180 G

[56] References Cited
UNITED STATES PATENTS 3,852,415  12/1974  Vandervoorde .................. 424/2

*Primary Examiner*—A. Louis Monacell
*Assistant Examiner*—Robert J. Warden
*Attorney, Agent, or Firm*—Curtis, Morris & Safford

[57] ABSTRACT

The present invention relates to a derivative of the alpha$_1$-fetospecific serum protein and to a process for preparing it from a solution containing alpha$_1$-fetospecific protein by treating the latter with neuraminidase and then isolating said derivative by electrophoresis.

7 Claims, No Drawings

DERIVATIVE OF ALPHA$_1$-FETOSPECIFIC SERUM PROTEIN AND PROCESS FOR ITS MANUFACTURE

The present invention relates to a derivative of the alpha$_1$- fetospecific serum protein and to a process for preparing it.

The protein body designated human alpha$_1$-fetospecific serum protein according to the recommendations given by World Health Organization is frequently called in recent literature — in a simpler way — alpha-fetoprotein or alpha$_1$-fetoprotein. From the immunological point of view, human alpha-fetoprotein is easy to establish in fetal serum, whereas it can only be established in sera of healthy adults using sensitive radioimmunological methods.

On the one hand, the isoelectric points, being 4.78 ± 0.05 or 5.08 for alpha-fetoprotein and 4.85 ± 0.05 for albumin, demonstrate the similarity of the electrophoretical properties of the two substances, whilst, on the other hand, the molecular weights of 64,000 to 75,000 for human fetoprotein and about 69,000 for albumin indicate a high degree of similarity thereof.

Under these circumstances, it is small wonder that it is very difficult to separate the alpha-fetoprotein from albumin since even the separation of, for example alpha$_1$-antitrypsin from albumin, which has an isoelectric point of 4.0 and a molecular weight of 45,000 according to literature, can only be carried out at a great experimental expense.

Up to now, the alpha-fetoprotein has been known as a diagnostic characteristic of primary liver cancer or hepatoma. Attempts have therefore been made to prepare the alpha-fetoprotein in pure form in order to use it as a diagnostic reagent and for the immunization of animals for obtaining specific antisera. For this purpose, the elimination of the albumin, which accompanies the alpha-fetoprotein down to the final stages of its purification, is frequently performed using the very complicated and costly method of immunoadsorption on carrier-bond antialbumin, the loss of substance being heavy.

An isoelectrical focussing likewise known in the art does not lead to sufficient amounts of substance to enable industrial exploitation.

Glycoproteins of the alpha-globulin range are known to modify substantially their electrophoretic mobility upon the action of the enzyme neuraminidase. The action of neuraminidase on a mixture of alpha$_1$-antitrypsin, orosomucoid and albumin was able to split off the neuraminic acid portions from the first-mentioned compounds, thus electrophoretically slowing down the glycoproteins, leaving the mobility of the albumin unaltered. This allows the asialo- and desialo-glycoproteins to be separated from albumin.

The alpha-fetoprotein is described as hardly or not at all to be influenced in its electrophoretic mobility by the action of neuraminidase, and this electrophoretic mobility is detectable — if at all — only by means of very sensitive methods.

In connection with contradictory information given in the literature on the neuraminic acid content of the alpha-fetoprotein, which does not appear to be taken for granted by those skilled in the art, there was a prejudice suggesting to apply the measures disclosed for the separation of the alpha$_1$-antitrypsin from albumin also for the manufacture of a derivative of the alpha-fetoprotein and the purification thereof, since preparative electrophoresis methods are considered far less selective than corresponding analytic measures.

Surprisingly, it has now been found that a derivative of the alpha-fetoprotein is obtained with a high degree of purity by treating an alpha-globulin fraction containing albumin and alpha-fetoprotein with the enzyme neuraminidase and then subjecting it to a zone-electrophoretic process which separates the fraction into distinct bands of albumin, a derivative of the alpha-feloprotein and other contaminations originally moving as alpha$_1$-globulins.

Hence, this invention provides a derivative of the alpha$_1$-fetospecific serum protein which a. is formed by the action of the enzyme neuraminidase on the alpha$_1$-fetospecific serum protein, b. is precipitated by means of an antiserum which is acting against the alpha$_1$-fetospecific serum protein and, c. upon injection in vertebrates, causes the formation of antibodies which are provided with specificities both against the alpha$_1$-fetospecific protein and against the derivative thereof, which has been prepared according to the invention.

This invention moreover provides a process for the manufacture of the derivative of the alpha$_1$-fetospecific serum protein, which comprises isolating a fraction containing the alpha$_1$-fetospecific serum protein and obtained from body fluids or tissue extracts which contain this protein in measurable concentrations, treating it with neuraminidase and then isolating it in pure form by a preparative electrophoretic process.

Useful apparatus for the electrophoretical separation are in particular electrophoresis arrangements which enable a preparative isolation of plasma proteins. Especially suitable is electrophoresis equipment which assures dissipation of Joule's heat generated during the electrophoretic separation and which use zone-stabilizing carrier substances for the separation. The carrier substances are frequently poured in the form of gels into troughs and tubs. Filter paper strips, plastic foils or direct contact are used to establish the electrically conducting connection to the electrodes which are positioned at the two opposite ends of the electrophoresis apparatus in containers filled with buffer solution.

Especially useful carriers are substances which are indifferent toward proteins and are insoluble in the electrophoresis buffer solution to be used. Some plastic materials, for example polyvinyl chloride and the copolymers thereof, have this property to a large extent. Polyvinyl chloride with the registered trade name Geon X 427 by Messrs. Goodrich Chem. Corp. Cleveland, Ohio/USA, is commercially available as granules and as such advantageously useful as carrier material. Using an electrophoresis equipment of the size 80 × 45 cm and the carrier material in a layer height of 1 cm, 3 to 5 g of protein can be separated within about 15 hours in an appropriate electrophoresis buffer solution, for example diethyl barbiturate or borate, at a pH of from 8 to 9, an ion strength of 0.08 to 0.12 and a field intensity of 4 to 6 volt/cm, thus yielding the derivative of the alpha-fetoprotein in a definite zone.

As starting material for obtaining the alpha-globulin fraction containing the alpha-fetoprotein, an alpha-fetoprotein-containing body fluid is used, advantageously fetal blood containing about 20 mg/ml of alpha-fetoprotein in a 20-week-old embryo, moreover plasma of new-borns and cord blood, but also plasma of patients suffering from primary liver cancer or the liver thereof as well as Ascites fluid, though the content of alpha-fetoprotein in these latter sources varies.

These materials are concentrated by methods which are known for the isolation of albumin and alpha-globulin, for which generally two methods may be chosen: On the one hand, the separation of the gamma-globulin fraction, whereupon albumin and alpha-globulins remain in the solution, on the other hand, the separation of the albumin and alpha-globulin fractions, whereupon gamma-globulins remain in the solution.

Examples of the separation of the gamma-globulins are the methods of salt fractionation, especially those using ammonium sulfate. According to that method, the ammonium sulfate is advantageously added to the body fluids until a saturation concentration of the salt of more than 45 % is reached, whereupon the gamma-globulins are precipitated.

Another exemplary possibility is the precipitation method carried out with organic water-miscible solvents, such as short-chained alcohols or other solvents, such as dioxan, tetrahydrofuran, acetone, which are known to have a similar precipitation behaviour as the cited salts, when appropriate concentrations are used.

A different method may be adopted especially by adding to the body fluids a water-soluble salt of an acridine base, for example 6,9-diamino-2-ethoxy-acridine lactate, in an appropriate concentration, whereby proteins are precipitated which have precipitation properties similar to those of albumin.

There is no obstacle to combining these measures which assure a concentration of the desired substances by fractionated, i.e. not complete, precipitation of the individual constituents. Thus, according to a preferred embodiment of the invention, the concentration of the alpha-fetoprotein from the body fluids, such as serum, pleura exudate or Ascites liquid, is carried out as follows:

The body fluid used is mixed with ammonium sulfate at a pH-value ranging from 6 to 9, preferably of 7, until a final concentration of from 1.8 to 2.2 M, preferably of 2.0 M, is reached, and the precipitate obtained is separated by centrifuging or filtering. The residue is eliminated. The salt content of the supernatant solution is reduced by the usual methods for removing salts from protein solutions, the simplest way being a dialysis against water of a <1% sodium chloride solution of neutral pH-value. The dialysate is mixed in a ratio adequate to the protein content with water-soluble derivatives of an acridine base, for example 6,9-diamino-2-ethoxy-acridine lactate, while adding 6 to 10 g, preferably 8 g, of the precipitating agent per 100 g of a protein at a pH of 6 – 8, preferably of 7, whereupon the precipitate formed is again separated by centrifuging or filtering and eliminated. Subsequently, at a pH of 7 – 10, preferably of 8.5, further amounts of a water-soluble derivative of the acridine base, for example 6,9-diamino-2-ethoxy-acridine lactate, of up to 20 – 30 g, preferably 25 g, per 100 g of the initially present amount of protein, are added to the solution freed from the precipitate. The precipitate which is obtained is isolated by centrifuging or filtering and the supernatant or the filtrate is eliminated. To remove the precipitating agent, the solid residue is dissolved in a weakly acid medium, preferably at a pH of about 5.0, and then the precipitating agent is separated from the protein by appropriate molecular sieve methods. According to another possibility, the precipitating agent itself is precipitated using an about 5 % chloride-containing aqueous solution, advantageously by adding an adequate amount of an about 25 % sodium chloride solution or the corresponding amount of the solid salt, and the protein is set free in solution. The precipitating agent may be filtered or centrifuged off. The protein solution is dialyzed against a buffer solution having a pH-value in the range of from 8 to 9, advantageously 8.6, using buffer systems which are commonly applied in biochemistry and contain a barbiturate, tris-hydroxymethylaminomethane, borate or comparable buffer substances, in a concentration causing an ion strength (molarity) of from 0.05 to 0.15, advantageously 0.10. At a protein concentration of about 2 %, which may be reached either by concentration through appropriate membranes or by dilution with a buffer substance, depending on the requirements, an electrophoretic separation is carried out in an apparatus suitable for a zone electrophoresis as, for example, described above, the alpha-fetoprotein-containing zone is isolated, this fraction is again dialyzed and, at a protein concentration of about 2 %, it is once more subjected to a zone electrophoresis.

The alpha-fetoprotein-containing zone thus obtained is combined with the enzyme neuraminidase (glycoprotein-N-acetyl-neuraminylhydrolase, classified under EC. 3.2.1.18), preferably obtained from Vibrio cholerae, while adding 0.5 to 50, preferably 5, units of enzyme per milligram of protein, and the mixture is maintained at 0°–25°C, preferably at 4°C, over a period of 5 to 20 hours, preferably 16 hours, at a pH of 5.0 to 5.8, the lower the temperature the longer the incubation time and vice versa.

For the treatment of the alpha-globulin zone, it is advantageous also to use other neuraminidases, especially those of microbial origin, preferably bacterial neuraminidases, for example in addition to the corresponding enzymes obtained from Vibrio cholerae, those obtained from pneumococci, Clostridium perfringens or Corynebacterium diphtheriae. As a function of the enzymes' origin, incubation is advantageously performed under optimum reaction conditions for the enzymes, with consideration of the known enzyme parameters, such as optimum pH-value, activators or inhibitors. A neuraminidase unit is defined as follows:

A neuraminidase unit is the amount of the enzyme required to release 1 microgram of N-acetylneuraminic acid from human $alpha_1$-acidic glycoprotein in a 0.05 molar sodium acetate buffer solution of pH 5.5 with the addition of 9 mg/ml of sodium chloride and 1 mg/ml of calcium chloride within a period of 15 minutes at 37°C (cf. E. Mohr and G. Schramm, Z. Naturf. 15b, page 568, 1960).

A zone electrophoresis carried out upon incubation under the known conditions leads to the separation of a zone which, especially in the immunological characteristic, corresponds to the human $alpha_1$-fetospecific serum protein and which is free from albumin and the original proteins moving as alpha-globulins.

The yield depends on the content of the $alpha_1$-fetoprotein in the starting material. Its average ranges from 20 to 40%. If the starting material contains a large amount of fetoprotein (100 – 200 mg %), yields range from 30 to 40 %, if there is less, the yields are lower (20 to 30 %).

This substance can be isolated with a high purity by elution of the carrier material within the range of the postalbumin, i.e. between albumin and the $alpha_1$-globulins. The quality of the preparation earmarks the product of the invention for the manufacture of a standard for alpha-fetoproteins, which may be used for quantitative immunological determination methods. Moreover, this derivative can be labeled by radioactive substances and used in a method for the radioimmunological determination of the alpha-fetoprotein as an antigen. The immunization of vertebrates, among which the mammals, especially herbivorous animals, such as horse, cattle, sheep, goat, rabbit and guinea pig are especially suitable, with the use of the derivative of the invention affords highly specific antisera against the alpha-fetoprotein. The antiserum may be reacted with fluorescent dyes for evidencing the alpha-fetospecific protein. It may be adsorbed to latex particles and is thus useful for the analysis of the $alpha_1$-fetospecific protein.

The following Example illustrates the invention.

EXAMPLE

1000 Milliliters of serum having an $alpha_1$-fetoprotein content of 164 mg/100 ml and a protein content of 4.4 % were diluted with 470 ml of a 0.9 % sodium chloride solution to yield a protein content of 3 %. Then, 1470 ml of a saturated ammonium sulfate solution were added while mechanically stirring. The precipitate obtained was separated by centrifuging and eliminated. The clear supernatant solution was freed from salts by dialysis against a 10-fold excess amount of neutralized distilled water which was changed several times, and then lyophilized.

The dry product containing $alpha_1$-fetoprotein (25 g) was dissolved at a concentration of 3 % in a 0.9 % sodium chloride solution and the pH of the solution was adjusted to 7.0 by means of 0.1N NaOH. The final volume was 833 ml. While stirring, 8 ml of a 3 % solution of 6,9-diamino-2-ethoxy-acridine lactate per 100 ml of protein solution were then added. The precipitate formed was centrifuged off and eliminated. The $alpha_1$-fetoprotein together with some accompanying proteins were precipitated by adding another 17 ml of a 3 % solution of 6,9-diamino-2-ethoxy-acridine lactate per 100 ml of initially used protein solution to the supernatant solution. The precipitate was isolated by centrifuging.

The protein was set free from the insoluble protein-acridine complex compound by adding 500 ml of a 5 % sodium chloride solution and subsequently stirring the solution vigorously (for 30 minutes), whereupon the acridine base precipitated as a chloride salt and was separated by filtration through a folded filter. The clear filtrate was then dialyzed twice against 10 l of a sodium diethyl-barbiturate buffer solution of pH 8.6, $\mu = 0.1$ (volume 530 ml; 2.1 % of protein).

The proteins were then separated by means of preparative zone electrophoresis: Portions of 70 ml each of the dialyzed protein solution were mixed while stirring with dry polyvinyl chloride powder to yield a stiff paste which was introduced into the electrophoresis apparatus, which was likewise filled with polyvinyl chloride as carrier material, except the zone filled with the said paste. The separation was performed in a diethyl-barbiturate buffer solution of pH 8.6, $\mu = 0.1$, in an electrical field of 6 volt/cm and a migration period of 15 hours. Thereafter, a filter paper strip was placed onto the paste. The paper strip was then colored by dipping into a solution of amido black and washed clean with a mixture of methanol and glacial acetic acid (9:1) to reveal the positions of the individual protein bands. The $alpha_1$-fetoprotein-containing zone following the albumin was taken out of the apparatus, placed on a glass frit having a capacity of 500 ml (G 3), and washed with 500 ml of the diethyl-barbiturate buffer of pH 8.6, $\mu = 0.1$.

The collected eluates (3.5 l) of several separating operations were concentrated to a volume of 200 ml by ultrafiltration. The protein content of the concentrate was then 1.1%. At a pH of 5.5, 5 units of neuraminidase were then added per mg of protein and incubated overnight at room temperature. The electrophoretic separation was repeated under the above-described conditions. The protein zone, which now showed a distinct limit toward the quick-moving albumin, and the now less mobile residue of the alpha-globulins, was withdrawn from the apparatus as disclosed above, placed on a glass frit (G 3) and eluted with 500 ml of diethyl-barbiturate. The eluates collected from several separating operations (1.5 l) were each dialyzed against 20 l of distilled water, which was changed several times, until the diethyl-barbiturate ions disappeared, and then lyophilized. The dry product obtained (0.55 g) was the highly purified derivative of the $alpha_1$-fetoprotein in a yield of 33.6 %.

We claim:

1. A derivative of the $alpha_1$-fetospecific serum protein, which
   a. is formed by the action of the enzyme neuraminidase on the $alpha_1$-fetospecific serum protein,
   b. is precipitated by an antiserum acting against the $alpha_1$-fetospecific serum protein, and
   c. upon injection in vertebrates, causes the formation of antibodies which are specific against both the $alpha_1$-fetospecific protein and against said derivative.

2. A process for the manufacture of a derivative of the $alpha_1$-fetospecific serum protein as claimed in claim 1, which comprises isolating a fraction containing the $alpha_1$-fetospecific serum protein from body fluids or tissue extracts, treating it with neuraminidase and isolating the derivative of the $alpha_1$-fetospecific serum protein in pure form by preparative electrophoresis.

3. A process as claimed in claim 2, wherein the fraction containing the $alpha_1$-fetospecific serum protein is isolated from body fluids or tissue extracts, preferably from fetal blood, plasma of new-borns, plasma of patients suffering from primary liver carcinoma, from Ascites liquid of extracts from the livers of patients suffering from primary liver carcinoma.

4. A process as claimed in claim 2, wherein the fraction containing the $alpha_1$-fetospecific serum protein is separated from accompanying proteins by a method of salt fractionation, advantageously using ammonium sulfate in a saturation concentration of the salt of more than 45 %.

5. A process as claimed in claim 2, wherein undesired proteins are separated from body fluids or tissue extracts at a pH-value of from 6 to 9 by an addition of ammonium sulfate until a final concentration of 1.8 to 2.2 M is reached, the salt content of the supernatant solution is reduced, water-soluble derivatives of an acridine base are added to this solution until a concentration is reached which does not yet precipitate the alpha₁-fetospecific protein, further amounts of a water-soluble derivative of the acridine base are added to the supernatant at pH 7 – 10 after separation by centrifuging or filtering off the resulting precipitate until a concentration is reached which precipitates the alpha₁-fetospecific protein from the solution, the residue is dissolved either in a weekly acid aqueous solution and the protein is separated from the precipitating agent by means of a molecular sieve method or by adding an adequate amount of chloride ions until a concentration of an about 5 % chloride-containing aqueous solution is reached, the precipitating agent is precipitated and the protein is set free in solution, the precipitate is centrifuged or filtered off, the protein solution is dialysed against a buffer solution at a pH-value of from 8 to 9, at an ion strength of from 0.05 to 0.15 and, at a protein concentration of about 2 %, the dialysate is subjected to a preparative carrier electrophoresis, whereupon the alpha₁-fetoprotein-containing zone is withdrawn and thus separated from remaining contaminations.

6. A process as claimed in claim 2, wherein the alpha₁-fetospecific serum protein is treated with a microbial neuraminidase at a pH-value optimum for the reaction of the enzyme, until an almost quantitative conversion of the protein into the derivative as claimed in claim 1 is achieved.

7. A process as claimed in claim 6, wherein the alpha₁-fetospecific serum protein is treated with neuraminidase obtained from Vibrio cholerae, at a pH of 5.0 to 5.8 in a ratio of 0.5 to 50 units of neuraminidase per mg of protein at a temperature of 0° to 25°C over a period of 5 to 20 hours, a long incubation time requiring low temperatures and a short incubation time requiring accordingly higher temperatures.

* * * * *